Sept. 24, 1968 W. DRAPKIN 3,403,216
MOUNTING MEANS FOR ELECTRICAL WIRING DEVICES
Filed April 5, 1967

INVENTOR
WILLIAM DRAPKIN
BY Darby & Darby
ATTORNEYS

United States Patent Office 3,403,216
Patented Sept. 24, 1968

3,403,216
MOUNTING MEANS FOR ELECTRICAL
WIRING DEVICES
William Drapkin, Brooklyn, N.Y., assignor to Slater Electric Inc., Glen Cove, N.Y., a corporation of New York
Filed Apr. 5, 1967, Ser. No. 628,703
4 Claims. (Cl. 174—53)

ABSTRACT OF THE DISCLOSURE

The device disclosed herein is a means for reducing the labor required in mounting an electrical wiring device such as a switch or receptacle in the usual wall box. The device disclosed consists essentially of the usual wiring device mounting strap which has been modified to provide a serrated spike at one end, replacing the usual screw, together with means at the opposite end comprising a captive screw which cooperates with a cut-out in the body of the strap to force the serrated spike into engagement with one outlet box mounting ear, or more exactly, the aperture in that mounting ear, when the screw is inserted in the threaded aperture in the other ear and tightened.

---

The present application is related to, and constitutes an improved form of the wiring device mounting means disclosed in the co-pending application of Herbert A Slater, Ser. No. 563,792, assigned to the assignee of this application.

At the present time, wiring devices such as switches and plug receptacles are mounted in metallic boxes which are affixed to a building structure, the mounting of the devices within such boxes being accomplished by providing as an integral part of the devices a mounting strap. The wall or outlet boxes are provided with mounting ears having threaded apertures therein and the mounting straps are provided with corresponding apertures, screws being utilized to fasten the mounting straps, and through them, the wiring devices in position in the outlet box. Additionally, it is customary at the present time to supply the two screws with the wiring device, the screws being retained in position in the strap apertures by placing fibre washers thereon. The placing of the washer requires an additional operation in the assembly of the wiring device, and in addition, is disadvantageous in that the fibre washer increases the possibility that the mounting strap and hence the wiring device itself, will not be properly grounded, this being especially true in the numerous instances in which the mounting strap does not rest against the edges of the outlet box, but rather rests against a plaster or Sheetrock wall, the box being recessed with respect to that wall.

The invention thus will be seen to comprise a means for mounting a wiring device in the usual outlet box, which materially reduces the labor required to mount the device in the box, and which at the same time provides grounding of the device to the box in a more sure manner than has heretofore been the case. It moreover, provides such a mounting means which is completely compatible with the mounting means now used and does not require any modification of the standard wall or outlet box.

Various objects and features of the invention will appear more fully when the following description is considered in connection with the annexed drawings in which, FIGURE 1 is a perspective view showing the mounting strap for a duplex outlet as it appears prior to the insertion of a screw therein;

Figure 1:
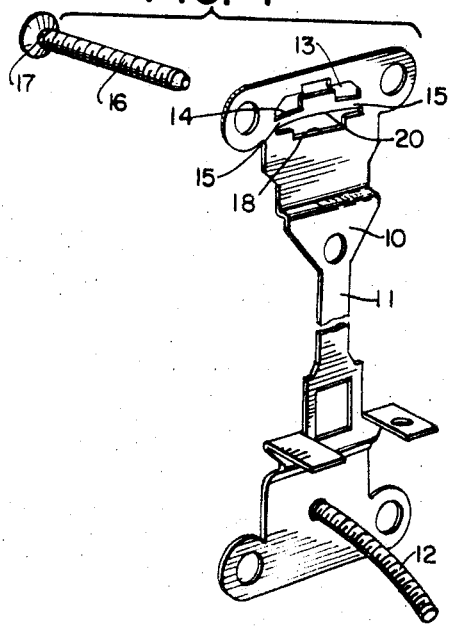
Figure 2:
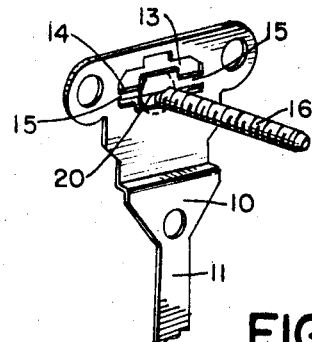
FIGURE 2 shows the mounting strap after the insertion of the screw and after a pressing operation which bends the strap and holds the screw in position in the strap for purposes of shipment.
Figure 3:
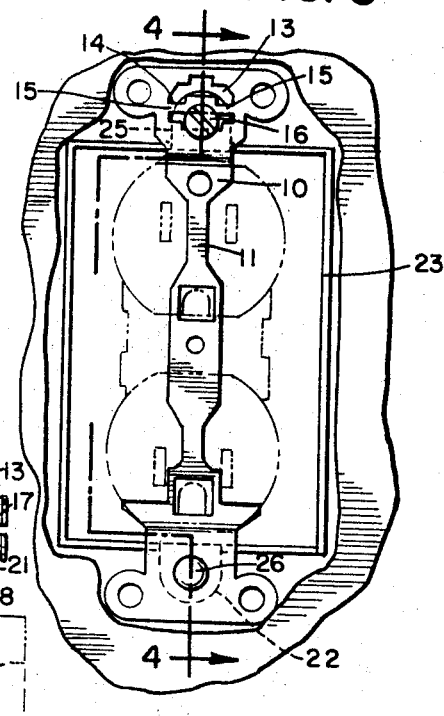
FIGURE 3 is a front-elevational view showing the wiring device installed in an outlet box.

Referring now to the drawings and particularly to FIGURES 1 and 2 thereof, the mounting strap 10 is shown alone for purposes of clarity but is in practice an integral part of the wiring device, in this instance a duplex receptacle, the narrow portion 11 of the strap extending between the housing and cover of the duplex outlet in a well-known manner. The particular form of the strap and the mode of uniting it with the wiring device is merely illustrative, the invention being concerned with the manner of mounting the strap on the outlet box.

In accordance with the present invention strap 10 is modified by affixing a serrated spike 12 of lesser diameter than the internal diameter of the ear threads at the lower end thereof, in the position normally occupied by one of the two mounting screws, the spike extending substantially perpendicular to the plane of the strap in a manner similar to that shown in the co-pending Slater application. In this instance, however, the spike 12 has been bent in a curve, as discussed hereinafter. It should also be mentioned at this time that although the spike has been shown as fixed in position, it may be so mounted in the strap that it is adjustable in position transversely of the plane of the strap, the rotational position of the spike, however, being fixed.

At its upper end the strap 10 is modified as compared with the conventional outlet strap in that the single circular aperture normally present has been replaced by a larger, generally rectangular opening 13, which is divided into two portions by means of a curved bar 14 extending from side to side of the opening 13. This curved bar 14 is joined to the main body of the strap at the sides by portions 15, which are narrow, so that after a screw such as that indicated at 16 is inserted through the lower portion of the opening 13 and positioned as shown in FIGURE 2, the bar 14 is bent downwardly so that an annular groove 17 in screw 16 is engaged by the lower edge 18 of the opening 13 on one side and by the curved edge 20 of the bar 14 on the opposite side, thereby holding the screw 16 captive in the mounting strap 11.

Figures 4, 5:
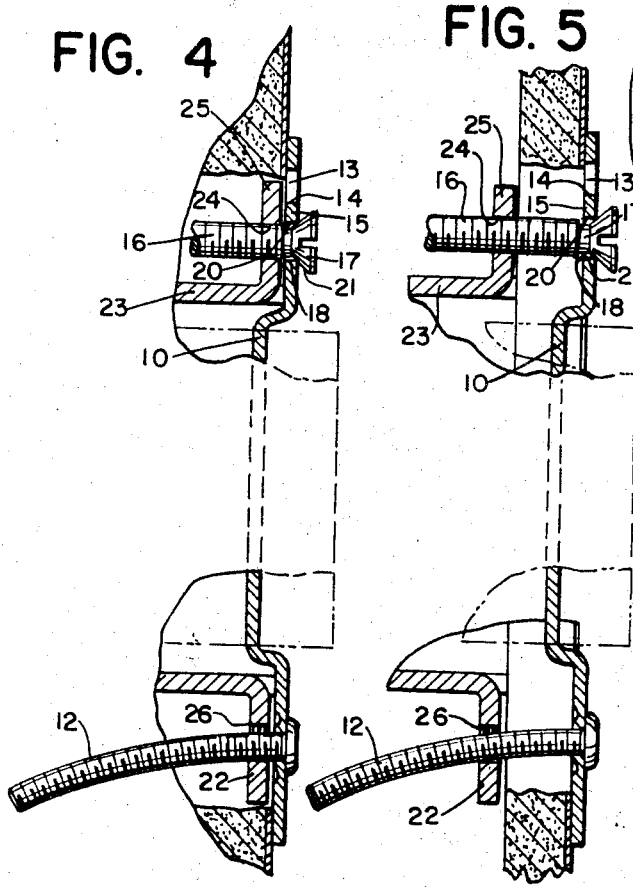
FIGURE 4 is a fragmentary vertical cross-sectional view on the plane of the line 4—4 of FIGURE 3 showing the wiring device in a flush-mounted box.
FIGURE 5 is a view similar to FIGURE 4, but showing the wiring device mounted in an outlet box which is recessed with respect to the wall surface.

As best seen in FIGURES 4 and 5, screw 16 has a beveled head 21 or is, in other words, a normal flat-head screw, the beveled head cooperating with the lower edge 18 of the opening 13 to cause the strap to move downwardly as the screw is tightened into position.

As is apparent from the above, the wiring device is shipped to the customer with the spike 12 fixed to one end of the mounting strap and the screw 16 held captive in a transversely extending slot in the opposite end of the strap. The installer needs only to place the spike 12 in position in the aperture 26 of the lower mounting ear 22 of the outlet box 23 and to thereafter thread the screw 16 into the threaded opening 24 in the upper ear 25 of the box 23.

The insertion of the spike 12 into the lower aperture as described is easily accomplished, since the spike is of a lesser diameter than the diameter of the internal thread in the box ear, and since in addition, the spike is curved to make insertion accomplished. As the screw 16 is tightened in its aperture, pressure of the beveled undersurface of the head causes the entire strap to move downwardly with respect to the outlet box, it being assumed for the purpose of this description, that the outlet box is mounted with its longitudinal axis in a vertical position, although it will be understood that the box may be mounted in a horizontal position if desired.

Such downward movement of the mounting strap, although of very limited extent, is sufficient to cause the serrations of the spike to engage firmly with the internal threads of the lower mounting ear 22, and fix the device in position at that end. At the same time the tightening of the screw 16 is effective to press the upper portion of the strap against the oulet box edge, as seen in FIGURE 4, or against the plaster or Sheetrock, as seen in FIGURE 5, and thus hold the mounting strap and the electrical device mounted thereon, be it switch, receptacle, pilot light, or other standard wiring device, firmly in position.

It will be observed that due to the mode of mounting the screw 16 in the mounting strap, and including particularly the fact that the screw is provided with the groove 17 adjacent the beveled head, and the crossbar 14 is deformable, it is not necessary to provide a special camming lever portion of the mounting strap, as is done in the Slater application above-referred to, but instead, the lower edge of the opening 13 cooperates with the beveled head of the screw to cooperate this camming function. As will be appreciated, if the bar 14 were not deformable as the screw was tightened, then the degree of tightening of the screw would be limited and the downward movement of the mounting strap as a whole, correspondingly limited.

As noted hereinabove, the mounting means of this invention also provides for improved grounding of the mounting strap and wiring device to the outlet box, both by virtue of the fact that the fibre washer is omitted, the screw head has a greater bearing surface against the deformable bar than would be the case were the screw inserted merely through a non-deformable slot, and the fact that the spike has a large contact area with its mounting ear and is in intimate contact with the body of the mounting strap.

While I have described a preferred embodiment of my invention, it will be understood that many modifications and variations thereof may be made; I wish therefore, to be limited not by the foregoing specification, but on the contrary, solely by the claims granted to me.

What is claimed is:

1. A mounting strap for mounting an electrical wiring device in an outlet box of the type having apertures at either end thereof adapted to receive fastening means for mounting the strap on the box with the wiring device within the box, the improvement comprising, a serrated spike extending substantially perpendicular to the plane of the strap in position to enter one of the box apertures, a screw mounted in the strap at the opposite end thereof in position to enter the other of said box apertures, said screw having an annular groove therein and a beveled head adjacent said groove, said screw being mounted in a transversely extending slot in said strap and said slot having the side thereof adjacent said opposite end deformable whereby as said screw is tightened it bears against the side of said slot nearest said first box aperture and forces the strap in a direction to cause engagement of the serrations of said spike with the threads of said one box aperture.

2. A mounting strap as claimed in claim 1 wherein said deformable slot side comprises a bar extending across a rectangular aperture, the juncture of said bar with the sides of said aperture being of reduced cross-sectional area.

3. A mounting strap as claimed in claim 1 wherein said serrated spike has a curved free end.

4. A mounting strap as claimed in claim 1 wherein said spike is of lesser outer diameter than the internal diameter of the threaded box aperture.

References Cited

UNITED STATES PATENTS

| | | | |
|---|---|---|---|
| 1,807,410 | 5/1931 | Hubbard | 174—57 |
| 3,059,045 | 10/1962 | Swartwood | 174—53 |

LARAMIE E. ASKIN, *Primary Examiner.*

D. A. TONE, *Assistant Examiner.*